(12) United States Patent
Wang et al.

(10) Patent No.: US 11,343,046 B2
(45) Date of Patent: May 24, 2022

(54) METHOD AND DEVICE FOR RECEIVING AND SENDING REFERENCE SIGNAL, AND COMPUTER-READABLE STORAGE MEDIUM

(71) Applicant: XI'AN ZHONGXING NEW SOFTWARE CO., LTD., Shaanxi (CN)

(72) Inventors: Yuxin Wang, Guangdong (CN); Zhaohua Lu, Guangdong (CN); YuNgok Li, Guangdong (CN); Chuangxin Jiang, Guangdong (CN); Shujuan Zhang, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/961,731

(22) PCT Filed: Nov. 20, 2018

(86) PCT No.: PCT/CN2018/116540
§ 371 (c)(1),
(2) Date: Jul. 13, 2020

(87) PCT Pub. No.: WO2019/137098
PCT Pub. Date: Jul. 18, 2019

(65) Prior Publication Data
US 2021/0067296 A1     Mar. 4, 2021

(30) Foreign Application Priority Data
Jan. 12, 2018 (CN) .......................... 201810032694.5

(51) Int. Cl.
*H04W 76/27* (2018.01)
*H04L 5/00* (2006.01)
(Continued)

(52) U.S. Cl.
CPC ........ *H04L 5/0051* (2013.01); *H04L 27/2607* (2013.01); *H04W 72/042* (2013.01);
(Continued)

(58) Field of Classification Search
CPC ... H04W 76/11; H04W 76/27; H04W 72/042; H04W 72/0446; H04W 72/0453;
(Continued)

(56) References Cited

U.S. PATENT DOCUMENTS

| 9,628,311 B2 | 4/2017 | Bertrand et al. | |
| 2015/0304994 A1* | 10/2015 | Kim | H04W 72/042 370/280 |

(Continued)

FOREIGN PATENT DOCUMENTS

| CN | 101330325 A | 12/2008 |
| CN | 101540631 A | 9/2009 |

(Continued)

OTHER PUBLICATIONS

ZTE, "Discussion on SRS capacity improvement" 3GPP TSG RAN WG1 Meeting #82bis—Malmo, Sweden, Oct. 5-9, 2015—R1-155265.

(Continued)

*Primary Examiner* — Wei Zhao
(74) *Attorney, Agent, or Firm* — KDB Firm PLLC (57) ABSTRACT

Provided are a method and device for receiving and sending a reference signal and a storage medium, the method for receiving includes steps described below. A reference signal resource used for sending the reference signal is determined; and the reference signal sent by using the reference signal resource is received. And the method for sending includes steps described below, a reference signal resource used for
(Continued)

```
┌──────────────────────────────────────────────┐
│ Determine a reference signal resource used   │  101
│   for sending the reference signal           │
└──────────────────────────────────────────────┘
                       │
                       ▼
┌──────────────────────────────────────────────┐
│ Receive the reference signal sent by using the│ 102
│         reference signal resource             │
└──────────────────────────────────────────────┘
``` sending the reference signal is determined; and the reference signal is sent by using the determined reference signal resource.

20 Claims, 2 Drawing Sheets

(51) Int. Cl.
    *H04W 76/11* (2018.01)
    *H04L 27/26* (2006.01)
    *H04W 72/04* (2009.01)
    *H04W 80/02* (2009.01)

(52) U.S. Cl.
    CPC ... *H04W 72/0446* (2013.01); *H04W 72/0453* (2013.01); *H04W 72/0466* (2013.01); *H04W 76/11* (2018.02); *H04W 76/27* (2018.02); *H04W 80/02* (2013.01)

(58) Field of Classification Search
    CPC ............ H04W 72/0466; H04W 80/02; H04L 5/0051; H04L 27/2607
    See application file for complete search history.

(56) References Cited

U.S. PATENT DOCUMENTS

| 2016/0043842 | A1 | 2/2016 | Gong et al. | |
|---|---|---|---|---|
| 2017/0180194 | A1 | 6/2017 | Noh et al. | |
| 2019/0044775 | A1* | 2/2019 | Zhang | H04W 72/0453 |
| 2020/0304263 | A1* | 9/2020 | Zhang | H04L 5/0048 |

FOREIGN PATENT DOCUMENTS

| CN | 102223726 | A | 10/2011 |
|---|---|---|---|
| CN | 103220101 | A | 7/2013 |
| CN | 103457690 | A | 12/2013 |
| CN | 103944665 | A | 7/2014 |
| CN | 104468019 | A | 3/2015 |
| CN | 106375074 | A | 2/2017 |
| CN | 106549695 | A | 3/2017 |
| CN | 106850023 | A | 6/2017 |
| CN | 107294683 | A | 10/2017 |
| CN | 107370590 | A | 11/2017 |
| CN | 108260219 | A | 7/2018 |
| JP | 2014510433 | A | 4/2014 |
| JP | 2014527354 | A | 10/2014 |
| WO | 2017012430 | A1 | 1/2017 |
| WO | 2017075812 | A1 | 5/2017 |
| WO | 2017083137 | A1 | 5/2017 |

OTHER PUBLICATIONS

European Search Report and Written Opinion for the European Patent Application No. EP18899523, dated Aug. 13, 2021, 9 pages.
Chinese Office Action for the Chinese Patent Application No. 2018100326945, dated Feb. 8, 2021, 9 pages.
Chinese Search Report for the Chinese Patent Application No. 2018100326945, dated Feb. 8, 2021, 4 pages.
Huawei, HiSilicon, "UL SRS design for beam management and CSI acquisition" 3GPP TSG RAN WG1 NR Ad Hoc Meeting—Nagoya, Japan, Sep. 18-21, 2017—R1-1715474.
Huawei, HiSilicon, "Remaining details of SRS design" 3GPP TSG RAN WG1 Meeting #91—Reno, USA, Nov. 27-Dec. 1, 2017—R1-1719441.
International Search Report, dated Jan. 30, 2019, Application No. PCT/CN2018/116540, Filed Date Nov. 20, 2018, 13 pages.
3rd Generation Partnership Project; Technical Specification Group Radio Access Network; Evolved Universal Terrestrial Radio Access (E-UTRA); Physical channels and modulation (Release 14) 3GPP TS 36.211 V14.5.0 (Dec. 2017).
Office Action for the Chinese Patent Application No. 2020538626, dated Oct. 19, 2021, 8 pages.
3rd Generation Partnership Project; Technical Specification Group Radio Access Network; NR; Physical channels and modulation (Release 15) 3GPP TS 38.211 V1.3.0 (Dec. 2017) 73 pages.
3GPP TS 36.211 V13.7.1 (Sep. 2017) Release 13—Technical Specification, 59 pages.
Sony., "Summary of SRS" 3GPP TSG RAN WG1 Meeting 91—Reno, USA, Nov. 27-Dec. 1, 2017—R1-1721564, 27 pages.
Office Action for the Korean Patent Application No. 10-2020-7023264, dated Apr. 12, 2022, 11 pages.

* cited by examiner

METHOD AND DEVICE FOR RECEIVING AND SENDING REFERENCE SIGNAL, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2018/116540, filed on Nov. 20, 2018, which claims priority to a Chinese patent application No. 201810032694.5 filed on Jan. 12, 2018, contents of both of which are incorporated herein by reference in their entireties.

TECHNICAL FIELD

The present disclosure relates to, but is not limited to, the field of communications.

BACKGROUND

In the related art, for example, in the long term evolution (LTE for short) technology, a physical downlink control channel (PDCCH for short) is used to carry uplink/downlink scheduling information and uplink power control information. A downlink control information (DCI for short) format is divided into DCI formats 0, 1, 1A, 1B, 1C, 1D, 2, 2A, 3, 3A, etc., after it is evolved to the LTE-A release 12, which adds DCI formats 2B, 2C, and 2D to support a variety of different applications and transmission modes. A first communication node, such as a base station (e-Node-B, eNB for short), may configure a second communication node, such as user equipment (UE for short), by downlink control information, or the second communication node accepts a configuration of higher layers, which is also called UE configuration by higher layer signaling.

A sounding reference signal (SRS for short) is a signal used by the second communication node and the first communication node to measure wireless channel state information (CSI for short). In an LTE system, a UE regularly sends an uplink SRS on a last data symbol of the transmitted subframe according to parameters indicated by an eNB, such as a frequency band, a frequency domain position, a sequence cyclic shift, a period, and a subframe offset. The eNB determines uplink CSI of the UE according to the received SRS, and performs operations such as frequency domain selection scheduling and closed-loop power control according to the obtained CSI.

It is proposed in a research of the LTE-A release 10 that in an uplink communication, a non-precoded SRS should be used, that is, an antenna-specified SRS, and precoding is performed on a demodulation reference signal (DMRS for short) of a physical uplink shared channel (PUSCH for short). The first communication node may estimate original uplink CSI by receiving the non-precoded SRS, and the precoded DMRS cannot enable the first communication node to estimate the original uplink CSI. At this time, when UEs use multiple antennas to send the non-precoded SRS, SRS resources required by each UE will be increased, which results in a decrease in the number of UEs that may be simultaneously multiplexed in the system. A UE may send the SRS through one of the two trigger modes including trigger through higher layer signaling (also called trigger type 0) and trigger through downlink control information (also called trigger type 1), where a periodic SRS is triggered based on the higher layer signaling, and an aperiodic SRS is triggered based on the downlink control information. An aperiodic SRS transmission manner is added to the LTE-A release 10, which improves the utilization rate of SRS resources to a certain extent and increases the flexibility of resource scheduling.

With the development of communication technologies, data service demand continues to increase, and available low frequency carriers are also very scarce. Therefore, communications based on under-utilized high frequency (30 to 300 GHz) carriers have become one of the important communication means for future high speed data communications. Communications on high frequency carriers have a large available bandwidth, which may provide effective high speed data communications. However, a great technical challenge faced by the communications on the high frequency carriers is that high frequency signals have a very large spatial fading compared with low frequency signals. Although the spatial fading will cause the high frequency signals in outdoor communications to have spatial fading loss problems, due to the decrease of their wavelengths, generally more antennas may be used, so that communications based on beams may be used to compensate for the spatial fading loss.

However, since each antenna needs to have a set of radio frequency links, when the number of antennas increases, digital beamforming also brings problems such as increased cost and power loss. Therefore, current researches are more inclined to hybrid beamforming, that is, a radio frequency beam and a digital beam collectively form a final beam.

In the new radio access technology (NR for short), except that the first communication node in the high frequency communication system will configure a large number of antennas to form downlink transmission beams, so as to compensate for the spatial fading of high frequency communications, the second communication node will also configure a large number of antennas to form uplink transmission beams, so the SRS will also be sent in the form of beams at this time. Due to the limited power of the second communication node, in order to enhance the uplink coverage of the SRS, an enhanced technology needs to be used for sending the SRS, meanwhile interferences between users and cells need to be considered, but there is no corresponding communication scheme in the related art.

SUMMARY

The present disclosure provides a method and device for receiving and sending a reference signal, and a computer-readable storage medium.

The present disclosure provides a method for receiving a reference signal, and the method for receiving includes steps described below.

A reference signal resource used for sending the reference signal is determined; and the reference signal sent by using the reference signal resource is received.

The present disclosure further provides a method for sending a reference signal, and the method includes steps described below. A reference signal resource used for sending the reference signal is determined; and the reference signal is sent by using the determined reference signal resource.

The present disclosure further provides a device for receiving a reference signal, and the device for receiving includes a first processor and a first memory. The first processor is configured to execute a program stored in the first memory to implement steps described below. A reference signal resource used for sending the reference signal is determined; and the reference signal sent by using the reference signal resource is received.

The present disclosure further provides a device for sending a reference signal, and the device for sending includes a second processor and a second memory. The second processor is configured to execute a program stored in the second memory to implement steps described below. A reference signal resource used for sending the reference signal is determined; and the reference signal is sent by using the determined reference signal resource.

The present disclosure provides a first computer-readable storage medium storing a computer program, and the computer program implements steps of the method for receiving when executed by a processor.

The present disclosure provides a second computer-readable storage medium storing a computer program, and the computer program implements steps of the method for sending when executed by a processor.

The present disclosure provides a method and device for receiving and sending a reference signal and a computer-readable storage medium. The method for receiving includes steps described below. A reference signal resource used for sending the reference signal is determined; and the reference signal sent by using the reference signal resource is received. The method for sending includes steps described below. A reference signal resource used for sending the reference signal is determined; and the reference signal is sent by using the determined reference signal resource.

Using the above technical schemes, random allocation of a resource may be realized by determining the resource used for sending the reference signal, such as a frequency domain resource, a code domain resource, or a resource configured by signaling, and this randomly allocated resource is used to send the reference signal, which can effectively avoid interferences between cells.

DETAILED DESCRIPTION

Hereinafter, the present disclosure will be described in detail with reference to the accompanying drawings and in conjunction with the embodiments. It should be noted that the embodiments in the present application and features in the embodiments may be combined with each other if there is no conflict.

It should be noted that terms "first", "second", "third", etc. in the specification, claims, and drawings of the present disclosure are used to distinguish similar objects, which are not necessary to describe a specific order or sequence.

The network architecture that may be operated in the embodiments of the present application includes a first communication node and a second communication node, where the first communication node and the second communication node interact with each other.

The first communication node refers to a node configured to determine a transmission mode of the second communication node and perform a signaling indication to the second communication node. The second communication node refers to a node configured to receive signaling. In an implementation manner, the first communication node or a third communication node may be a base station of a macro cell, a base station or a transmission node of a small cell, a sending node in a high frequency communication system, and a sending node in an Internet of Things system, and the second communication node may be a node in a communication system, such as a user equipment (UE), a mobile phone, a portable device, and an automobile. In another implementation, a base station of a macro cell, a base station or a transmission node of a small cell, a sending node in a high frequency communication system, a sending node in an Internet of Things system, etc. may also be served as the second communication node, and a UE, etc. may be served as the first communication node.

The reference signal may be one of an SRS, an uplink demodulation reference signal, an uplink signal for performing a random access, a downlink demodulation reference signal, a channel status information reference signal, or a phase tracking reference signal.

Embodiment One

Figure 1:
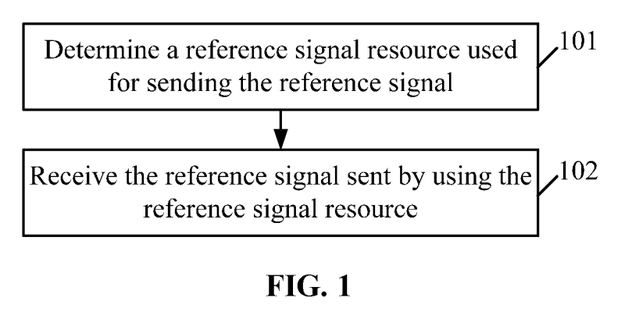
FIG. 1 is a flowchart of a method embodiment for receiving a reference signal according to an embodiment of the present disclosure.

An embodiment of the present disclosure provides a method for receiving a reference signal, which may be applied to the first communication node. FIG. 1 is a flowchart of a method embodiment for receiving a reference signal according to an embodiment of the present disclosure, as shown in FIG. 1. The method includes steps described below.

In step 101: A reference signal resource used for sending the reference signal is determined.

Here, step 101 may be performed by the first communication node. For example, the first communication node directly acquires the reference signal resource used for sending the reference signal by a device for sending (such as the second communication node).

The reference signal resource may be a frequency domain resource. When the reference signal resource includes the frequency domain resource, the frequency domain resource used for sending the reference signal is determined according to a transmission comb index of the reference signal. For example, the transmission comb index is 0 and 1, the transmission comb index 0 corresponds to a transmission of the reference signal on an even subcarrier, and the transmission comb index 1 corresponds to a transmission of the reference signal on an odd subcarrier.

Exemplarily, a manner for determining the transmission comb index of the reference signal includes one of steps described below. The transmission comb index of the reference signal is determined according to a transmission comb index and an index offset configured by higher level radio resource control (RRC for short) signaling; or a transmission comb index configured by the reference signal resource and used on a first time domain symbol within the reference signal resource is determined, and a predefined transmission comb index of the reference signal is used on remaining time domain symbols.

Another alternative manner for determining the transmission comb index includes that the transmission comb index used for sending the reference signal is determined according to received cooperation information.

Another alternative manner for determining the transmission comb index includes that transmission comb indexes used by reference signals of multiple ports are determined. Exemplarily, it is predefined that reference signals of different ports or different port groups use different transmission comb indexes; it is predefined that different ports within a port group use a same transmission comb index, and ports between port groups use different transmission comb indexes; and it is predefined that different ports within a port group use different transmission comb indexes, and ports between port groups use a same transmission comb index.

Alternatively, the reference signal resource may be a code domain resource. When the reference signal resource includes the code domain resource, the code domain resource used for sending the reference signal is determined according to a sequence group number of the reference signal and a sequence number of the reference signal.

The reference signal resource is configured by signaling. When the reference signal is an aperiodic reference signal or a type 1 of reference signal, a parameter of a time slot offset of the reference signal resource is configured by the signaling. For example, when the time slot offset has a value of 0, it is determined that the reference signal resource is a current time slot; and when the time slot offset has a value of 1, it is determined that the reference signal resource is a next time slot having an uplink transmission resource; or, when the time slot offset has a value of 1, it is determined that the reference signal resource is the current time slot; and when the time slot offset has a value of 0, it is determined that the reference signal resource is the next time slot having an uplink transmission resource.

Alternatively, multiple reference signal resources are configured by the signaling, a time domain guard interval among the multiple reference signal resources is Y time domain symbols; where a value of Y is determined in at least one of following manners: the value of Y is determined according to a capability of the device for sending; the value of Y is configured by the signaling; or different values of Y are configured for different subcarrier spacings.

In an actual implementation, a transmission power used by the reference signal may also be determined; and the transmission power is configured by the signaling, or the transmission power is related to the number of transmission combs of the reference signal.

In step 102: the reference signal sent by the second communication node and using the resource is received.

Here, step 102 may be performed by the first communication node. For example, the first communication node receives the reference signal sent from the device for sending according to the determined reference signal resource.

In the embodiments of the present disclosure, the method may further include steps described below. Cooperation information is received; and the reference signal is received and processed based on the cooperation information. Exemplarily, the cooperation information includes at least one of: information used for indicating the transmission comb index of the reference signal, a sequence identity (ID) of the reference signal, or information about a time-frequency resource occupied by the reference signal.

Further, the first communication node receives the cooperation information sent by the third communication node, and the first communication node uses an advanced receiver to receive and process the reference signal sent by using the reference signal resource based on the cooperation information.

Exemplarily, the first communication node and the third communication node are generally base stations, the second communication node is generally a terminal, and the first communication node and the third communication node interact the cooperation information through one of an X2 interface, an enhanced X2 interface, an Xn interface or an internal interface, the first communication node and the third communication node may effectively schedule resources for users in a local cell based on the cooperation information to avoid strong interferences between cells. For example, when the reference signal of the third communication node occupies a transmission comb 0 and a transmission comb 2, the first communication node sends the received cooperation information to the second communication node, so as to schedule the reference signal of the second communication node to occupy a transmission comb 1 and a transmission comb 3.

It should be noted that in the 4G technology (also known as the fourth generation mobile communication technology), the transmission comb index and the value of the transmission comb are the same concept, while in the 5G technology (also known as the fifth generation mobile communication technology), the transmission comb index and the value of the transmission comb are collectively referred to as the offset value of the transmission comb index. Therefore, the transmission comb index, the value of the transmission comb, and the offset value of the transmission comb mentioned in the embodiments of the present disclosure are the same concept.

Embodiment Two

Figure 2:
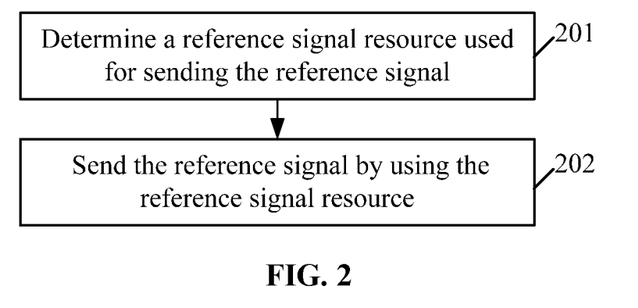
FIG. 2 is a flowchart of a method embodiment for sending a reference signal according to an embodiment of the present disclosure.

Corresponding to the method described in the embodiment one, an embodiment of the present disclosure provides a method for sending a reference signal, which may be applied to the second communication node. FIG. 2 is a flowchart of a method embodiment for sending a reference signal according to an embodiment of the present disclosure, as shown in FIG. 2, the method includes steps described below.

In step 201: A reference signal resource used for sending the reference signal is determined.

Here, step 201 may be performed by the device for sending. For example, the second communication node determines the reference signal resource used for sending the reference signal, and sends the reference signal according to the determined reference signal resource; and resource information used by the reference signal is also sent to a device for receiving (e.g., the first communication node), then the reference signal is received by the device for receiving according to the resource information.

The reference signal resource may be a frequency domain resource. When the reference signal resource includes the frequency domain resource, the frequency domain resource used for sending the reference signal is determined according to the transmission comb index of the reference signal.

Exemplarily, a manner for determining the transmission comb index of the reference signal includes one of steps described below. The transmission comb index of the reference signal is determined according to a transmission comb index and an index offset configured by higher layer RRC signaling; or a transmission comb index configured by the reference signal resource and used on a first time domain symbol within the reference signal resource is determined, and a predefined transmission comb index of the reference signal is used on remaining time domain symbols.

Another alternative manner for determining the transmission comb index includes that the transmission comb index used for sending the reference signal is determined according to received cooperation information.

Another alternative manner for determining the transmission comb index includes that transmission comb indexes used by reference signals of multiple ports are determined.

Exemplarily, multiple ports use a same transmission comb index, multiple ports use different transmission comb indexes, or L port groups use different transmission comb indexes; where L is a number of groups after the multiple ports are grouped.

Alternatively, the reference signal resource may be a code domain resource. When the reference signal resource includes the code domain resource, the code domain resource used for sending the reference signal is determined according to a sequence group number of the reference signal and a sequence number of the reference signal.

The reference signal resource is configured by signaling. When the reference signal is an aperiodic reference signal or a type 1 of reference signal, a parameter of a time slot offset of the reference signal resource is configured by the signaling. For example, when the time slot offset has a value of 0, it is determined that the reference signal resource is a current time slot; and when the time slot offset has a value of 1, it is determined that the reference signal resource is a next time slot having an uplink transmission resource.

Alternatively, multiple reference signal resources are configured by the signaling, and a time domain guard interval among the multiple reference signal resources is Y time domain symbols; where a value of Y is determined in at least one of following manners: the value of Y is determined according to a capability of the device for sending; the value of Y is configured by the signaling; or different values of Y are configured for different subcarrier spacings.

In an actual implementation, a transmission power used by the reference signal may also be determined; the transmission power is configured by signaling, or the transmission power is related to the number of transmission combs of the reference signal.

In step 202: the determined reference signal resource is used to send the reference signal.

Here, step 202 may be performed by the device for sending. For example, the second communication node uses the reference signal resource to send the reference signal to the device for receiving; and the device for receiving receives the reference signal according to a predetermined reference signal resource.

In an actual implementation, after receiving cooperation information sent by the third communication node, the first communication node sends the cooperation information to the second communication node, or the second communication node directly receives the cooperation information sent by the third communication node.

In order to further embody the purpose of the present disclosure, on the basis of embodiment one and embodiment two, the method for receiving and sending the reference signal of the present disclosure will be further exemplified below.

Embodiment Three

When the reference signal resource includes the frequency domain resource, the frequency domain resource used for sending the reference signal is determined according to the transmission comb index of the reference signal.

A first alternative method for determining the transmission comb index, which is the method for determining the transmission comb index of the reference signal and includes one of following steps: the transmission comb index of the reference signal is determined according to the transmission comb index and the index offset configured by higher layer RRC signaling; or a transmission comb index configured by the reference signal resource and used on a first time domain symbol within the reference signal resource is determined, and a predefined transmission comb index of the reference signal is used on remaining time domain symbols.

Further, the index offset of the reference signal may be determined according to at least one of following parameters: an index of a time slot where the reference signal is located, an index of a symbol where the reference signal is located, a number of symbols occupied by the reference signal or by the reference signal resource, a sequence of the reference signal ID, a radio network temporary identity (RNTI), a number of transmission combs of the reference signal, or a cell ID. Here, the RNTI is an RNTI of the second communication node.

Further, the index offset of the reference signal or the index of the predefined transmission comb of the reference signal is determined according to following formulas:

$$(\Sigma_{m=0}^{K-1} c(K \cdot n_{s,f}^{\mu} + m) \cdot 2^m) \bmod K_{TC}$$

$$(\Sigma_{m=0}^{K-1} c(K \cdot (n_{s,f}^{\mu} M + l') + m) \cdot 2^m) \bmod K_{TC};$$

where $K_{TC}$ is the number of transmission combs of the reference signal, $l' \in \{0, 1, \ldots, M-1\}$ is a predefined serial number or a serial number of a time domain symbol within the reference signal resource, K is an integer, M is a certain predefined integer or a configured number of symbols of the reference signal, $c(K \cdot n_{s,f}^{\mu} + m)$ is a value corresponding to a sequence number $K \cdot n_{s,f}^{\mu} + m$ in a pseudo-random sequence, $c(K \cdot (n_{s,f}^{\mu} M + l') + m)$ is a value corresponding to a sequence number $K \cdot (n_{s,f}^{\mu} M + l') + m$ in the pseudo-random sequence, and $n_{s,f}^{\mu}$ is a slot number in a radio frame. Here, M is a number of symbols of the reference signal configured by the first communication node or a certain predefined integer.

The index offset may also be determined according to following formulas:

$$\Delta(n_{s,f}^{\mu}) = (\Sigma_{m=0}^{K-1} c(K \cdot n_{s,f}^{\mu} + m) \cdot 2^m) \bmod K_{TC}; \quad \text{formula (1)}$$

$$\Delta(n_{s,f}^{\mu}, l') = (\Sigma_{m=0}^{K-1} c(K \cdot (n_{s,f}^{\mu} M + l') + m) \cdot 2^m) \bmod K_{TC}; \quad \text{formula (2)}$$

where, $\Delta(n_{s,f}^{\mu})$ and $\Delta(n_{s,f}^{\mu}, l')$ are desired index offsets.

Exemplarily, when K has a value of 8, the formula (1) is transferred to $\Delta(n_{s,f}^{\mu}) = (\Sigma_{m=0}^{7} c(8 \cdot n_{s,f}^{\mu} + m) \cdot 2^m) \bmod K_{TC}$; and the formula (2) is transferred to $\Delta(n_{s,f}^{\mu}, l) = (\Sigma_{m=0}^{7} c(8 \cdot (n_{s,f}^{\mu} M + l') + m) \cdot 2^m) \bmod K_{TC}$.

When the value of K is 8, the predefined transmission comb index of the reference signal may be determined according to following formulas:

$$(\Sigma_{m=0}^{7} c(8 \cdot n_{s,f}^{\mu} + m) \cdot 2^m) \bmod K_{TC}; \quad \text{formula (3)}$$

$$(\Sigma_{m=0}^{7} c(8 \cdot (n_{s,f}^{\mu} M + l') + m) \cdot 2^m) \bmod K_{TC}. \quad \text{formula (4)}$$

$N_{symb}^{SRS}$ is used to replace M, $N_{symb}^{SRS}$ is a number of time domain symbols within the reference signal resource, then the formula (2) may also be transferred to:

$$\Delta(n_{s,f}^{\mu}, l') = (\Sigma_{m=0}^{K-1} c(K \cdot (n_{s,f}^{\mu} N_{symb}^{SRS} + l') + m) \cdot 2^m) \bmod K_{TC},$$

the formula (4) may further be transferred to $(\Sigma_{m=0}^{7} c(8 \cdot (n_{s,f}^{\mu} N_{symb}^{SRS} + l') + m) \cdot 2^m) \bmod K_{TC}$.

Exemplarily, when M in the above formulas has a value of 14, then l'∈{0, 1, . . . , 13}, the serial number of the time domain symbol within the reference signal resource or the predefined serial number is one of 0 to 13.

Exemplarily, an initial value of the pseudo-random sequence includes any one of:

$$c_{init}=\lfloor N_{ID}^{cell}/K_{TC} \rfloor, c_{init}=N_{ID}^{cell} \bmod K_{TC},$$
$$c_{init}=\lfloor n_{ID}^{SRS}/K_{TC} \rfloor, c_{init}=n_{ID}^{SRS}, c_{init}=N_{ID}^{cell},$$
$$c_{init}=\lfloor n_{ID}^{SRS}/K_{TC} \rfloor \cdot 2^5+(n_{ID}^{SRS}+\Delta_{ss}) \bmod K_{TC}, \text{ or}$$
$$c_{init}=n_{ID}^{SRS} \bmod K_{TC};$$

where $N_{ID}^{cell}$ is a cell identity (ID), $n_{ID}^{SRS}$ is a virtual cell ID or a sequence ID of the reference signal, $\lfloor \; \rfloor$ is a floor function, and $\Delta_{ss} \in \{0, 1, \ldots, K_{TC}-1\}$.

A second alternative method for determining the transmission comb index, which determines transmission comb indexes used by reference signals of multiple ports.

Further, the step in which the transmission comb indexes used by the reference signals of multiple ports are determined includes at least one of: it is predefined that reference signals of different ports or different port groups use different transmission comb indexes; it is predefined that different ports within a port group use a same transmission comb index, and ports between port groups use different transmission comb indexes; or, it is predefined that different ports within a port group use different transmission comb indexes, and ports between port groups use a same transmission comb index.

Further, an occupation mode of the transmission comb indexes used by the reference signals of multiple ports includes at least one of: multiple ports using a same transmission comb index, multiple ports using different transmission comb indexes, or L port groups using different transmission comb indexes. In the embodiments of the present disclosure, L is a number of groups after multiple ports are grouped.

Exemplarily, a method for grouping the port groups includes at least one of steps described below. The port groups are grouped based on an increasing order or a decreasing order of port indexes; or the port groups are grouped based on a value of $\bmod(p_i, L)$ to divide ports with a same mod value into a same group; where mod is a modulus function, $p_i$ is a port index of the reference signal. For example, the increasing order of port indexes includes 0, 1, 2 to 7, port indexes 0 to 3 are divided into one group, and port indexes 4 to 7 are divided into one group.

Further, a number of transmission combs occupied by the reference signals of multiple ports is configured by signaling.

Further, when the transmission comb index configured by the reference signal resource is k, the transmission comb index used by reference signals of one or more predefined ports in the multiple ports is k, and transmission comb indexes used by reference signals of remaining ports are one of k, $\bmod(k+K_{TC}/2, K_{TC})$, $\bmod(p_i+k+K_{TC}/2, K_{TC})$ or $\bmod(p_i+k, K_{TC})$; where mod is a modulus function, $p_i$ is a port index of a reference signal, and $K_{TC}$ is a number of transmission combs of the reference signal.

Exemplarily, the number of ports may be any one of 1 to 128. For example, the transmission comb indexes used by reference signals of four ports are determined with k being 2 and $K_{TC}$ being 8, through the above rules, if using the rule that a predefined port in the multiple ports uses the transmission comb index k, and the transmission comb indexes used by the reference signals of remaining ports are mod $(p_i+k+K_{TC}/2, K_{TC})$, where a port 0 is a predefined port, it may be determined that the port 0 of the reference signal occupies the transmission comb 2, and the port 1 occupies a transmission comb $\bmod(1+2+4, 8)=7$, the port 2 occupies a transmission comb $\bmod(2+2+4, 8)=0$, and the port 3 occupies a transmission comb $\bmod(3+2+4, 8)=1$.

Further, the transmission comb index of the reference signal is obtained according to a cyclic shift parameter corresponding to the reference signal; or, the transmission comb index of the reference signal is obtained according to a segment position where a cyclic shift of the reference signal is located. The transmission comb index of the reference signal obtained according to the cyclic shift parameter corresponding to the reference signal includes at least one of:

$$k_{TC}^{(p_i)} = \begin{cases} \left(\bar{k}_{TC}+\dfrac{K_{TC}}{2}\right) \bmod K_{TC}; n_{SRS}^{cs} \in \left\{\dfrac{n_{SRS}^{cs,max}}{2}, \dfrac{n_{SRS}^{cs,max}}{2}+1, \ldots, n_{SRS}^{cs,max}-1\right\}, \\ \qquad p_i \in \{1, 3\}, N_{ap}=4, K_{TC}=2 \\ \left(\bar{k}_{TC}+\dfrac{K_{TC}}{2}\right) \bmod K_{TC}; n_{SRS}^{cs} \in \left\{\dfrac{n_{SRS}^{cs,max}}{3}, \dfrac{n_{SRS}^{cs,max}}{3}+1, \ldots, \dfrac{2n_{SRS}^{cs,max}}{3}-1\right\}, \\ \qquad p_i \in \{1, 3\}, N_{ap}=4, K_{TC}=4 \\ (\bar{k}_{TC}+p_i) \bmod K_{TC}; n_{SRS}^{cs} \in \left\{\dfrac{2n_{SRS}^{cs,max}}{3}, \dfrac{2n_{SRS}^{cs,max}}{3}+1, \ldots, n_{SRS}^{cs,max}-1\right\}, \\ \qquad N_{ap}=4, K_{TC}=4 \\ \bar{k}_{TC}; \text{others} \end{cases}$$

where, $k_{TC}^{(p_i)}$ is a transmission comb index used by a port, $K_{TC}$ is a number of transmission combs of the reference signal, $p_i$ is a port index of the reference signal, $N_{ap}$ is a number of transmission ports of the reference signal, $\bar{k}_{TC}$ is a transmission comb index configured by signaling, $n_{SRS}^{cs}$ is a cyclic shift of the reference signal, and $n_{SRS}^{cs,max}$ is a maximum serial number of cyclic shifts of the reference signal or a number of available cyclic shifts of the reference signal.

Further, a segmentation manner of the cyclic shifts of the reference signal may include that available cyclic shifts of the reference signal are segmented according to a number of different modes of the reference signal occupying the transmission combs. Four antennas have three modes, a first mode is that the four antennas occupy a same transmission comb, a second mode is that the four antennas occupy different transmission combs, and a third mode is that the four antennas are grouped, each group occupies a different transmission comb, a same transmission comb is occupied within a same group, and different transmission combs are occupied between groups.

Further, the step in which N transmission comb indexes used by reference signals of $N_{ap}$ ports are determined includes at least one of steps described below.

$N_{ap}$ is configured to be equal to N; the $N_{ap}$ ports are divided into L port groups, and when L is equal to N, there is a one-to-one correspondence between N port groups and N transmission combs; or the $N_{ap}$ ports are divided into $\lceil N_{ap}/N \rceil$ port groups, and there is a one-to-one correspondence between N ports in each port group and the N transmission combs. Each port in the port group including N ports is in a one-to-one correspondence to the N transmission combs, where N has a value less than or equal to an integer of $N_{ap}$, and $\lceil \; \rceil$ is a ceiling function.

In the embodiments of the present disclosure, the second communication node randomizes transmission combs occupied by the transmitted reference signal, strong interferences to neighboring cells caused by multiple consecutive orthogonal frequency division multiplexing (abbreviated as OFDM) symbols of the second communication node can be avoided, thereby playing a role in randomizing inter-cell interferences.

Embodiment Four

When the reference signal resource includes a code domain resource, the code domain resource used for sending the reference signal is determined according to a sequence group number of the reference signal and a sequence number of the reference signal.

Further, when the sequence number of the reference signal is configured to be hopping-enabled, the sequence ID of the reference signal is used to initialize the pseudo-random sequence, or $c_{init} = \lfloor n_{ID}^{SRS}/30 \rfloor \cdot 2^5 + n_{ID}^{SRS}$ mod 30 is used as an initial value of the pseudo-random sequence; where, $n_{ID}^{SRS}$ is the sequence ID of the reference signal or a virtual cell ID, and mod is a modulus function.

Embodiment Five

The reference signal resource is configured by signaling.

A first alternative configuration method is that when the reference signal is an aperiodic reference signal or a type 1 of reference signal, a parameter of a time slot offset of the reference signal resource is configured by the signaling. Exemplarily, when the time slot offset has a value of 0, it means that the reference signal is sent in a current time slot; and when the time slot offset has a value of 1, it means that the reference signal is sent on a next time slot having an uplink transmission resource.

A second alternative configuration method is to configure multiple reference signal resources by the signaling, and a time domain guard interval among the multiple reference signal resources is Y time domain symbols. Exemplarily, a value of Y is determined in at least one of following manners: the value of Y is determined according to a capability of the device for sending; the value of Y is configured by the signaling; or different values of Y are configured for different subcarrier spacings.

The manner in which the different subcarrier spacings are configured with the different values of Y includes at least one of:

when a subcarrier spacing is configured to 0, or the subcarrier spacing is 15 KHz, the value of Y is 1;

when a subcarrier spacing is configured as 1, or the subcarrier spacing is 30 KHz, the value of Y is 1;

when a subcarrier spacing is configured to 2, or the subcarrier spacing is 60 KHz, the value of Y is 1;

when a subcarrier spacing is configured as 3, or the subcarrier spacing is 120 KHz, the value of Y is 2; or when a subcarrier spacing is configured to be 4, or the subcarrier spacing is 240 KHz, the value of Y is 4.

A third alternative configuration method is to configure multiple reference signal resources with incrementally changed serial numbers by the signaling. Exemplarily, when values of time domain starting positions corresponding to the multiple reference signal resources with the incrementally changed serial numbers appear to repeat or decrease, a reference signal resource corresponding to a time domain starting position where repeating or decreasing begins is acted on an uplink symbol in a next time slot having an uplink symbol resource.

Embodiment Six

The reference signal sent by using the determined reference signal resource is received.

The first communication node receives the cooperation information sent by the third communication node, and uses an advanced receiver to receive and process the reference signal sent by using the reference signal resource based on the cooperation information. Exemplarily, the cooperation information includes: information for indicating the transmission comb index of the reference signal, a sequence ID of the reference signal, and information about a time-frequency resource occupied by the reference signal. The advanced receiver includes at least one of: a maximum likelihood receiver, an interference cancellation receiver, or a minimum mean square error receiver.

For example, when the advanced receiver is the interference cancellation receiver, the first communication node first demodulates a signal B, which is from a cell where the third communication node is located, in a received total signal C based on the cooperation information, and then obtains a target signal of the local cell through C minus B.

Embodiment Seven

A transmission power used by the reference signal is determined; the transmission power is configured by signaling, or the transmission power is related to a number of transmission combs of the reference signal.

Further, the transmission power used by the reference signal includes a transmission power that is increased or decreased by Q dB relative to uplink data or a physical uplink shared channel;

the signaling includes at least one of: signaling for indicating whether to increase or decrease the transmission power, or signaling for indicating that the transmission power of the reference signal is increased or decreased by Q dB;

the transmission power related to the number of transmission combs of the reference signal includes: when the number of transmission comb of the reference signal is 8, Q is 9; when the number of transmission combs of the reference signal is 16, Q is 12; when the number of transmission combs of the reference signal is 4, Q is 6; and when the number of transmission combs of the reference signal is 2, Q is 3.

Embodiment Eight

The step in which the multiple reference signal resources are configured by the signaling includes steps described below. The first communication node configures multiple reference signal resources to the second communication node by the signaling, a time domain starting symbol position corresponding to a reference signal resource with a serial number of n is m, and a time domain starting symbol position corresponding to a reference signal resource with a serial number of n+1 is g, and when g is less than or equal to m, the reference signal resource with the serial number of n+1 is acted on an uplink symbol in a next consecutive or non-consecutive time slot.

For example, four reference signal resources are configured, which are denoted as a reference signal resource 0, a reference signal resource 1, a reference signal resource 2, and a reference signal resource 3, reference signal ports in these four reference signal resources are 0, 1, 2, and 3, time domain starting symbol positions corresponding to these four reference signal resources are 8, 10, 12, and 8, or, 8, 10, 12, and 9, respectively, then the second communication node acts the reference signal resource 0, the reference signal resource 1, and the reference signal resource 2 on the current time slot, and acts the reference signal resource 3 on an uplink symbol in the next consecutive or non-consecutive time slot. Or, if the next consecutive time slot does not contain an uplink symbol resource, the second communication node will not use the reference signal resource 3.

Through the above manner, a function that the second communication node uses antenna switching to send the reference signal can be realized.

Alternatively, the above-mentioned configuration manner or use manner of the reference signal resource is only used when the reference signal is sent by using the antenna switching.

Where, the above configuration transmission mode is limited to sending aperiodic reference signals, or applies to aperiodic reference signals, semi-persistent reference signals, and periodic reference signals.

Embodiment Nine

Figure 3:
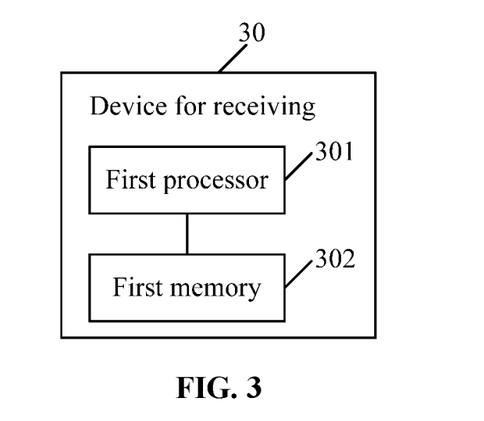
FIG. 3 is a schematic structural diagram of a composition of a device for receiving a reference signal according to an embodiment of the present disclosure.

Based on the same inventive concept as the method for receiving according to the embodiments of the present disclosure, an embodiment of the present disclosure further provides a device for receiving a reference signal. FIG. 3 is a schematic structural diagram of a composition of the device for receiving a reference signal according to an embodiment of the present disclosure. The device for receiving may be applied to the first communication node, as shown in FIG. 3, the receiving device 30 includes a first processor 301 and a first memory 302.

The first processor 301 is configured to execute a program stored in the first memory 302 to implement following steps described below.

A reference signal resource used for sending the reference signal is determined; and the reference signal sent by using the reference signal resource is received.

In an actual implementation, the first processor 301 is configured to execute the program stored in the first memory 302 to implement a following step: when the reference signal resource includes a frequency domain resource, the frequency domain resource used for sending the reference signal is determined according to a transmission comb index of the reference signal.

In an actual implementation, the first processor 301 is configured to execute the program stored in the first memory 302 to implement following steps:

the transmission comb index of the reference signal is determined according to a transmission comb index and an index offset configured by the higher layer RRC signaling; and a transmission comb index configured by the reference signal resource and used on a first time domain symbol in the reference signal resource is determined, and a predefined transmission comb index is used on remaining time domain symbols.

In an actual implementation, the first processor 301 is further configured to execute the program stored in the first memory 302 to implement following a step:

the index offset of the reference signal is determined according to at least one of following parameters: an index of the time slot where the reference signal is located, an index of the symbol where the reference signal is located, a number of symbols occupied by the reference signal or by reference signal resources, a sequence ID of the reference signal, an RNTI, a number of transmission combs of the reference signal, or a cell ID.

In an actual implementation, the first processor 301 is configured to execute the program stored in the first memory 302 to implement a following step: the index offset of the reference signal or the predefined transmission comb index of the reference signal is determined according to following formulas:

$$(\Sigma_{m=0}^{K-1} c(K \cdot n_{s,f}^{\mu} + m) \cdot 2^m) \bmod K_{TC}$$

$$(\Sigma_{m=0}^{K-1} c(K \cdot (n_{s,f}^{\mu} M + l') + m) \cdot 2^m) \bmod K_{TC};$$

where $K_{TC}$, is a number of transmission combs of the reference signal, $l' \in \{0, 1, \ldots, M-1\}$ is a predefined serial number or a serial number of a time domain symbol within the reference signal resource, K is an integer, M is a certain predefined integer or a number of configured symbols of the reference signal, $c(K \cdot n_{s,f}^{\mu} + m)$ is a value corresponding to a sequence number $K \cdot n_{s,f}^{\mu} + m$ in a pseudo-random sequence, $c(K \cdot (n_{s,f}^{\mu} M + l') + m$ is a value corresponding to a sequence number $K \cdot (n_{s,f}^{\mu} M + l') + m$ in the pseudo-random sequence, and $n_{s,f}^{\mu}$ is a slot number in a radio frame.

In an actual implementation, an initial value of the pseudo-random sequence includes one of:

$$c_{init} = \lfloor N_{ID}^{cell}/K_{TC} \rfloor, c_{init} = N_{ID}^{cell} \bmod K_{TC},$$
$$c_{init} = \lfloor n_{ID}^{SRS}/K_{TC} \rfloor, c_{init} = n_{ID}^{SRS}, c_{init} = N_{ID}^{cell},$$
$$c_{init} = \lfloor n_{ID}^{SRS}/K_{TC} \rfloor \cdot 2^5 + (n_{ID}^{SRS} + \Delta_{ss}) \bmod K_{TC}, \text{ or}$$
$$c_{init} = n_{ID}^{SRS} \bmod K_{TC};$$

where $N_{ID}^{cell}$ is a cell identity (ID), $n_{ID}^{SRS}$ is a virtual cell ID or a sequence ID of the reference signal, $\lfloor \; \rfloor$ is a floor function, and $\Delta_{ss} \in \{0, 1, \ldots, K_{TC}-1\}$.

In an actual implementation, the first processor 301 is further configured to execute the program stored in the first memory 302 to implement a following step: transmission comb indexes used by reference signals of multiple ports are determined.

In an actual implementation, the first processor 301 is configured to execute the program stored in the first memory 302 to implement a following step: N transmission comb indexes used by reference signals of $N_{ap}$ ports are determined, which includes at least one of steps described below.

$N_{ap}$ is configured to be equal to N;

the $N_{ap}$ ports are divided into L port groups, and when L is equal to N, there is a one-to-one correspondence between the N port groups and the N transmission combs; or the $N_{ap}$ ports are divided into $\lceil N_{ap}/N \rceil$ port groups, and there is a one-to-one correspondence between N ports in each port group and the N transmission combs, where r is a ceiling function.

In an actual implementation, the step in which the transmission comb indexes used by the reference signals of multiple ports are determined includes at least one of:

it is predefined that reference signals of different ports or different port groups use different transmission comb indexes;

it is predefined that different ports within a port group use a same transmission comb index, and it is predefined ports between port groups use different transmission comb indexes; or it is predefined that different ports within a port group use different transmission comb indexes, and it is predefined ports between port groups use a same transmission comb index.

In an actual implementation, an occupation mode of the transmission comb indexes used by the reference signals of multiple ports includes at least one of: multiple ports using a same transmission comb index, multiple ports using different transmission comb indexes, or L port groups using different transmission comb indexes, where L is a number of groups after the multiple ports are grouped.

In an actual implementation, a method for grouping the port groups includes at least one of:

the port groups are grouped based on an increasing order or a decreasing order of port indexes; or the port groups are grouped based on a value of mod($p_i$, L) to divide ports with a same mod value into a same group; where mod is a modulus function, $p_i$ is a port index of the reference signal, and L is a number of groups after the multiple ports are grouped.

In an actual implementation, the first processor 301 is configured to execute the program stored in the first memory 302 to implement following steps: when the transmission comb index configured by the reference signal resource is k, the transmission comb index used by reference signals of one or more predefined ports in the multiple ports is k, and transmission comb indexes used by reference signals of remaining ports are one of k, mod(k+$K_{TC}$/2, $K_{TC}$ mod($p_i$+k+$K_{TC}$/2, $K_{TC}$) or mod($p_i$+k, $K_{TC}$); where mod is a modulus function, $p_i$ is a port index of a reference signal, and $K_{TC}$ is a number of transmission combs of the reference signal.

In an actual implementation, the first processor 301 is configured to execute the program stored in the first memory 302 to implement a following step: the number of transmission combs occupied by the reference signals of the multiple ports is configured by signaling.

In an actual implementation, the first processor 301 is configured to execute the program stored in the first memory 302 to implement a following step: the transmission comb index of the reference signal is obtained according to a cyclic shift parameter corresponding to the reference signal.

In an actual implementation, the step in which the transmission comb index of the reference signal is obtained according to the cyclic shift parameter corresponding to the reference signal includes at least one of:

$$k_{TC}^{(p_i)} = \begin{cases} \left(\bar{k}_{TC} + \frac{K_{TC}}{2}\right) \bmod K_{TC}; n_{SRS}^{cs} \in \left\{\frac{n_{SRS}^{cs,max}}{2}, \frac{n_{SRS}^{cs,max}}{2}+1, \ldots, n_{SRS}^{cs,max}-1\right\}, \\ \quad p_i \in \{1, 3\}, N_{ap} = 4, K_{TC} = 2 \\ \left(\bar{k}_{TC} + \frac{K_{TC}}{2}\right) \bmod K_{TC}; n_{SRS}^{cs} \in \left\{\frac{n_{SRS}^{cs,max}}{3}, \frac{n_{SRS}^{cs,max}}{3}+1, \ldots, \frac{2n_{SRS}^{cs,max}}{3}-1\right\}, \\ \quad p_i \in \{1, 3\}, N_{ap} = 4, K_{TC} = 4 \\ (\bar{k}_{TC} + p_i) \bmod K_{TC}; n_{SRS}^{cs} \in \left\{\frac{2n_{SRS}^{cs,max}}{3}, \frac{2n_{SRS}^{cs,max}}{3}+1, \ldots, n_{SRS}^{cs,max}-1\right\}, \\ \quad N_{ap} = 4, K_{TC} = 4 \\ \bar{k}_{TC}; \text{others} \end{cases}$$

where, $k_{TC}^{(p_i)}$ is a transmission comb index used by a port, $K_{TC}$ is a number of transmission combs of the reference signal, $p_i$ is a port index of the reference signal, $N_{ap}$ is a number of transmission ports of the reference signal, $\bar{k}_{TC}$ is a transmission comb index configured by signaling, $n_{SRS}^{cs}$ is a cyclic shift of the reference signal, and $n_{SRS}^{cs,max}$ is a maximum serial number of cyclic shifts of the reference signal or a number of available cyclic shifts of the reference signal.

In an actual implementation, before the reference signal resource used for sending the reference signal is determined, the first processor 301 is further configured to execute the program stored in the first memory 302 to implement a following step:

cooperation information is received, and the cooperation information is used for determining the transmission comb index for sending the reference signal, or the cooperation information is used as a basis for receiving and processing the reference signal.

In an actual implementation, the first processor 301 is configured to execute the program stored in the first memory 302 to implement a following step:

the reference signal sent by using the reference signal resource is received and processed by an advanced receiver based on the cooperation information.

In an actual implementation, the cooperation information comprises at least one of: information for indicating the transmission comb index of the reference signal, a sequence ID of the reference signal, or information about a time-frequency resource occupied by the reference signal, or, when a time slot offset has a value of 1, it is determined that the reference signal resource is a current time slot; and when the time slot offset has a value of 0, it is determined that the reference signal resource is a next time slot having an uplink transmission resource.

In an actual implementation, the first processor 301 is further configured to execute the program stored in the first memory 302 to implement a following step: the reference signal resource is configured by signaling.

In an actual implementation, the first processor 301 is configured to execute the program stored in the first memory 302 to implement a following step: when the reference signal is an aperiodic reference signal or a type 1 of reference signal, a parameter of a time slot offset of the reference signal resource is configured by the signaling.

In an actual implementation, the first processor 301 is configured to execute the program stored in the first memory 302 to implement following steps: when the time slot offset has a value of 0, it is determined that the reference signal resource is a current time slot; and when the time slot offset has a value of 1, it is determined that the reference signal resource is a next time slot having an uplink transmission resource; or, when the time slot offset has a value of 1, it is determined that the reference signal resource is a current time slot; and when the time slot offset has a value of 0, it is determined that the reference signal resource is a next time slot having an uplink transmission resource.

In an actual implementation, the first processor 301 is configured to execute the program stored in the first memory 302 to implement a following step: when multiple reference signal resources are configured by the signaling, a time domain guard interval among the multiple reference signal resources is Y time domain symbols; where a value of Y is determined in at least one of following manners:

the value of Y is determined according to a capability of a device for sending;

the value of Y is configured by the signaling; or different values of Y are configured for different subcarrier spacings.

In an actual implementation, the manner in which the different subcarrier spacings are configured with the different values of Y includes at least one of:

when a subcarrier spacing is configured to 0, or the subcarrier spacing is 15 KHz, the value of Y is 1;

when a subcarrier spacing is configured as 1, or the subcarrier spacing is 30 KHz, the value of Y is 1;

when a subcarrier spacing is configured to 2, or the subcarrier spacing is 60 KHz, the value of Y is 1;

when a subcarrier spacing is configured as 3, or the subcarrier spacing is 120 KHz, the value of Y is 2; or when a subcarrier spacing is configured to be 4, or the subcarrier spacing is 240 KHz, the value of Y is 4.

In an actual implementation, the first processor 301 is configured to execute the program stored in the first memory 302 to implement a following step: a time domain starting symbol position corresponding to a reference signal resource with a serial number of n is m, and a time domain starting symbol position corresponding to the reference signal resource with a serial number of n+1 is g, when g is less than or equal to m, the reference signal resource with the serial number of n+1 is acted on an uplink symbol in a next consecutive or non-consecutive time slot.

In an actual implementation, the first processor 301 is configured to execute the program stored in the first memory 302 to implement a following step: multiple reference signal resources with incrementally changed serial numbers are configured by the signaling.

In an actual implementation, the first processor 301 is further configured to execute the program stored in the first memory 302 to implement a following step: when values of time domain starting positions corresponding to the multiple reference signal resources with the incrementally changed serial numbers appear to repeat or decrease, a reference signal resource corresponding to a time domain starting position where repeating or decreasing begins is acted on an uplink symbol in a next time slot having an uplink symbol resource.

In an actual implementation, the first processor 301 is configured to execute the program stored in the first memory 302 to implement a following step: when the reference signal resource includes a code domain resource, the code domain resource used for sending the reference signal is determined according to a sequence group number of the reference signal and a sequence number of the reference signal.

In an actual implementation, the first processor 301 is further configured to execute the program stored in the first memory 302 to implement a following step: when the sequence number of the reference signal is configured to be hopping-enabled, a sequence ID of the reference signal is used to initialize a pseudo-random sequence, or $c_{init}=\lfloor n_{ID}^{SRS}/30 \rfloor \cdot 2^5 + n_{ID}^{SRS}$ mod 30 is used as an initial value of the pseudo-random sequence; where $n_{ID}^{SRS}$ is the sequence ID of the reference signal or a virtual cell ID, and mod is a modulus function.

In an actual implementation, the first processor 301 is further configured to execute the program stored in the first memory 302 to implement a following step: a transmission power used by the reference signal is determined; the transmission power is configured by signaling, or the transmission power is related to a number of transmission combs of the reference signal.

In an actual implementation, the transmission power used by the reference signal includes a transmission power that is increased by Q dB or is decreased by Q dB relative to uplink data or a physical uplink shared channel;

the signaling includes at least one of: signaling for indicating whether to increase or decrease the transmission power, or signaling for indicating that the transmission power of the reference signal is increased or decreased by Q dB;

the transmission power related to the number of transmission combs of the reference signal includes: when the number of transmission comb of the reference signal is 8, Q is 9; and when the number of transmission combs of the reference signal is 16, Q is 12.

Embodiment Ten

Figure 4:
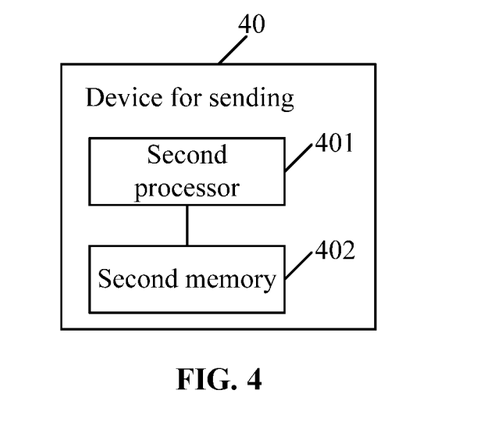
FIG. 4 is a schematic structural diagram of a composition of a device for sending a reference signal according to an embodiment of the present disclosure.

Based on the same inventive concept as the method embodiment for sending of the present disclosure, an embodiment of the present disclosure further provides a device for sending a reference signal. FIG. 4 is a schematic structural diagram of a composition of a device for sending a reference signal according to an embodiment of the disclosure, as shown in FIG. 4, the device for sending 40 includes a second processor 401 and a second memory 402.

The second processor 401 is configured to execute a program stored in the second memory 402 to implement following steps:

A reference signal resource used for sending the reference signal is determined; and the reference signal is sent by using the determined reference signal resource.

In an actual implementation, the second processor 401 is configured to execute the program stored in the second memory 402 to implement a following step: when the reference signal resource includes a frequency domain resource, the frequency domain resource used for sending the reference signal is determined according to a transmission comb index of the reference signal.

In an actual implementation, the second processor 401 is configured to execute the program stored in the second memory 402 to implement following steps:

the transmission comb index of the reference signal is determined according to a transmission comb index and an index offset configured by higher layer RRC signaling; and a transmission comb index configured by the reference signal resource and used on a first time domain symbol within the reference signal resource is determined, and a predefined transmission comb index is used on remaining time domain symbols.

In an actual implementation, the second processor 401 is further configured to execute the program stored in the second memory 402 to implement a following step:

the index offset of the reference signal is determined according to at least one of following parameters: an index of a time slot where the reference signal is located, an index of a symbol where the reference signal is located, a number of symbols occupied by the reference signal or by the reference signal resource, a sequence ID of the reference signal, an RNTI, a number of transmission combs of the reference signal, or a cell ID.

In an actual implementation, the second processor 401 is configured to execute the program stored in the second memory 402 to implement a following step: the reference signal index offset or the predefined transmission comb index of the reference signal is determined according to following formulas:

$$(\Sigma_{m=0}^{K-1} c(K \cdot n_{s,f}^{\mu} + m) \cdot 2^m) \mod K_{TC}$$

$$(\Sigma_{m=0}^{K-1} c(K \cdot (n_{s,f}^{\mu} M + l') + m) \cdot 2^m) \mod K_{TC};$$

where $K_{TC}$ is a number of transmission combs of the reference signal, $l' \in \{0, 1, \ldots, M-1\}$ is a predefined serial number or a serial number of a time domain symbol within the reference signal resource, K is an integer, M is a certain predefined integer or a number of configured symbols of the reference signal, $c(K \cdot n_{s,f}^{\mu} + m)$ is a value corresponding to a sequence number $K \cdot n_{s,f}^{\mu} + m$ in a pseudo-random sequence, $c(K \cdot (n_{s,f}^{\mu} M + l') + m)$ is a value corresponding to a sequence number $K \cdot (n_{s,f}^{\mu} M + l') + m$ in the pseudo-random sequence, and $n_{s,f}^{\mu}$ is a slot number in a radio frame.

In an actual implementation, an initial value of the pseudo-random sequence includes one of:

$c_{init} = \lfloor N_{ID}^{cell} / K_{TC} \rfloor, c_{init} = N_{ID}^{cell} \mod K_{TC},$
$c_{init} = \lfloor n_{ID}^{SRS} / K_{TC} \rfloor, c_{init} = n_{ID}^{SRS}, c_{init} = N_{ID}^{cell},$
$c_{init} = \lfloor n_{ID}^{SRS} / K_{TC} \rfloor \cdot 2^5 + (n_{ID}^{SRS} + \Delta_{ss}) \mod K_{TC},$ or
$c_{init} = n_{ID}^{SRS} \mod K_{TC};$ where $N_{ID}^{cell}$ is a cell identity (ID), $n_{ID}^{SRS}$ is a virtual cell ID or a sequence ID of the reference signal, $\lfloor \ \rfloor$ is a floor function, and $\Delta_{ss} \in \{0, 1, \ldots, K_{TC}-1\}$.

In an actual implementation, the second processor 401 is further configured to execute the program stored in the second memory 402 to implement a following step: transmission comb indexes used by the reference signals of multiple ports are determined.

In an actual implementation, the second processor 401 is configured to execute the program stored in the second memory 402 to implement a following step: N transmission comb indexes used by reference signals of $N_{ap}$ ports are determined, which includes at least one of steps described below.

$N_{ap}$ is configured to be equal to N;

the $N_{ap}$ ports are divided into L port groups, and when L is equal to N, there is a one-to-one correspondence between N port groups and N transmission combs; or the $N_{ap}$ ports are divided into $\lceil N_{ap}/N \rceil$ port groups, and there is a one-to-one correspondence between N ports in each port group and the N transmission combs, where $\lceil \ \rceil$ is a ceiling function.

In an actual implementation, the step in which the transmission comb indexes used by the reference signals of multiple ports are determined includes at least one of:

it is predefined that reference signals of different ports or different port groups use different transmission comb indexes;

it is predefined that different ports within a port group use a same transmission comb index, and it is predefined that ports between port groups use different transmission comb indexes; or it is predefined that different ports within a port group use different transmission comb indexes, and it is predefined that ports between port groups use a same transmission comb index.

In an actual implementation, an occupation mode of the transmission comb indexes used by the reference signals of multiple ports includes at least one of: multiple ports using a same transmission comb index, multiple ports using different transmission comb indexes, or L port groups using different transmission comb indexes, where L is a number of groups after the multiple ports are grouped.

In an actual implementation, a method for grouping the port groups includes at least one of:

the port groups are grouped based on an increasing order or a decreasing order of port indexes; or the port groups are grouped based on a value of $\mod(p_i, L)$ to divide ports with a same mod value into a same group; where mod is a modulus function, $p_i$ is a port index of a reference signal, and L is a number of groups after the multiple ports are grouped.

In an actual implementation, the second processor 401 is configured to execute the program stored in the second memory 302 to implement following steps: when the transmission comb index configured by the reference signal resource is k, it is determined that the transmission comb index used by reference signals of one or more predefined ports in the multiple ports is k, and transmission comb indexes used by reference signals of remaining ports are one of k, $\mod(k+K_{TC}/2, K_{TC})$, $\mod(p_i+k+K_{TC}/2, K_{TC})$ or $\mod(p_i+k, K_{TC})$; where mod is a modulus function, $p_i$ is a port index of a reference signal, and $K_{TC}$ is a number of transmission combs of the reference signal.

In an actual implementation, the second processor 401 is configured to execute the program stored in the second memory 402 to implement a following step: a number of transmission combs occupied by the reference signals of the multiple ports is configured by signaling.

In an actual implementation, the second processor 401 is configured to execute the program stored in the second memory 402 to implement a following step: the transmission comb index of the reference signal is obtained according to a cyclic shift parameter corresponding to the reference signal.

In an actual implementation, the step in which the transmission comb index of the reference signal is obtained according to the cyclic shift parameter corresponding to the reference signal includes at least one of:

$$k_{TC}^{(p_i)} = \begin{cases} \left(\bar{k}_{TC} + \dfrac{K_{TC}}{2}\right) \mod K_{TC}; n_{SRS}^{cs} \in \left\{\dfrac{n_{SRS}^{cs,max}}{2}, \dfrac{n_{SRS}^{cs,max}}{2}+1, \ldots, n_{SRS}^{cs,max}-1\right\}, \\ \quad p_i \in \{1,3\}, N_{ap}=4, K_{TC}=2 \\ \left(\bar{k}_{TC} + \dfrac{K_{TC}}{2}\right) \mod K_{TC}; n_{SRS}^{cs} \in \left\{\dfrac{n_{SRS}^{cs,max}}{3}, \dfrac{n_{SRS}^{cs,max}}{3}+1, \ldots, \dfrac{2n_{SRS}^{cs,max}}{3}-1\right\}, \\ \quad p_i \in \{1,3\}, N_{ap}=4, K_{TC}=4 \\ (\bar{k}_{TC} + p_i) \mod K_{TC}; n_{SRS}^{cs} \in \left\{\dfrac{2n_{SRS}^{cs,max}}{3}, \dfrac{2n_{SRS}^{cs,max}}{3}+1, \ldots, n_{SRS}^{cs,max}-1\right\}, \\ \quad N_{ap}=4, K_{TC}=4 \\ \bar{k}_{TC}; \text{others} \end{cases}$$

where, $k_{TC}^{(p_i)}$ is a transmission comb index used by a port, $K_{TC}$ is a number of transmission combs of the reference signal, $p_i$ is a port index of the reference signal, $N_{ap}$ is a number of transmission ports of the reference signal, $\bar{k}_{TC}$ is a transmission comb index configured by signaling, $n_{SRS}^{cs}$ is a cyclic shift of the reference signal, and $n_{SRS}^{cs,max}$ is a maximum serial number of cyclic shifts of the reference signal or a number of available cyclic shifts of the reference signal.

In an actual implementation, before the reference signal resource used for sending the reference signal is determined, the second processor 401 is further configured to execute the program stored in the second memory 402 to implement a following step:

cooperation information is received, and the cooperation information is used to determine the transmission comb index used for sending the reference signal.

In an actual implementation, the cooperation information includes at least one of: information for indicating the transmission comb index of the reference signal, a sequence ID of the reference signal, and information about a time-frequency resource occupied by the reference signal.

In an actual implementation, the second processor 401 is further configured to execute the program stored in the second memory 402 to implement a following step: the reference signal resource is configured by signaling.

In an actual implementation, the second processor 401 is configured to execute the program stored in the second memory 402 to implement a following step: when the reference signal is an aperiodic reference signal or a type 1 of reference signal, a parameter of a time slot offset of the reference signal resource is configured by signaling.

In an actual implementation, the second processor 401 is configured to execute the program stored in the second memory 402 to implement following steps: when the time slot offset has a value of 0, it is determined that the reference signal resource is a current time slot; and when the time slot offset has a value of 1, it is determined that the reference signal resource is a next time slot having an uplink transmission resource; or, when the time slot offset has a value of 1, it is determined that the reference signal resource is a current time slot; and when the time slot offset has a value of 0, it is determined that the reference signal resource is a next time slot having an uplink transmission resource.

In an actual implementation, the second processor 401 is configured to execute the program stored in the second memory 402 to implement a following step: when multiple reference signal resources are configured by the signaling, a time domain guard interval among the multiple reference signal resources is Y time domain symbols; where a value of Y is determined in at least one of following manners:

the value of Y is determined according to a sending capability;

the value of Y is configured by the signaling; or different values of Y are configured for different subcarrier spacings.

In an actual implementation, the manner in which the different subcarrier spacings are configured with the different values of Y includes at least one of:

when a subcarrier spacing is configured to 0, or the subcarrier spacing is 15 KHz, the value of Y is 1;

when a subcarrier spacing is configured as 1, or the subcarrier spacing is 30 KHz, the value of Y is 1;

when a subcarrier spacing is configured to 2, or the subcarrier spacing is 60 KHz, the value of Y is 1;

when a subcarrier spacing is configured as 3, or the subcarrier spacing is 120 KHz, the value of Y is 2; or when a subcarrier spacing is configured to be 4, or the subcarrier spacing is 240 KHz, the value of Y is 4.

In an actual implementation, the second processor 401 is configured to execute the program stored in the second memory 402 to implement a following step: a time domain starting symbol position corresponding to a reference signal resource with a serial number of n is m and a time domain starting symbol position corresponding to the reference signal resource with a serial number of n+1 is g, and when g is less than or equal to m, the reference signal resource with the serial number of n+1 is acted on an uplink symbol in a next consecutive or non-consecutive time slot.

In an actual implementation, the second processor 401 is configured to execute the program stored in the second memory 402 to implement a following step: multiple reference signal resources with incrementally changed serial numbers are configured by the signaling.

In an actual implementation, the second processor 401 is further configured to execute the program stored in the second memory 402 to implement a following step: when values of time domain starting positions corresponding to the multiple reference signal resources with the incrementally changed serial numbers appear to repeat or decrease, a reference signal resource corresponding to a time domain starting position where repeating or decreasing begins is acted on an uplink symbol in a next time slot having an uplink symbol resource.

In an actual implementation, the second processor 401 is configured to execute the program stored in the second memory 402 to implement a following step: when the reference signal resource includes a code domain resource, the code domain resource used for sending the reference signal is determined according to a sequence group number of the reference signal and a sequence number of the reference signal.

In an actual implementation, the second processor is configured to execute the program stored in the second memory to implement a following step: when the sequence number of the reference signal is configured to be hopping-enabled, a sequence ID of the reference signal is used to initialize a pseudo-random sequence, or $c_{init}=\lfloor n_{ID}^{SRS}/30 \rfloor \cdot 2^5 + n_{ID}^{SRS} \bmod 30$ is used as an initial value of the pseudo-random sequence; where $n_{ID}^{SRS}$ is the sequence ID of the reference signal or a virtual cell ID, and mod is a modulus function.

In an actual implementation, the second processor 401 is further configured to execute the program stored in the second memory 402 to implement a following step: a transmission power used by the reference signal is determined; the transmission power is configured by signaling, or the transmission power is related to the number of transmission combs of the reference signal.

In an actual implementation, the transmission power used by the reference signal includes a transmission power that is increased by Q dB or is decreased by Q dB relative to uplink data or a physical uplink shared channel;

the signaling includes at least one of: signaling for indicating whether to increase or decrease the transmission power, signaling for indicating that the transmission power of the reference signal is increased or decreased by Q dB;

the transmission power related to the number of transmission combs of the reference signal includes: when the number of transmission comb of the reference signal is 8, Q is 9; and when the number of transmission combs of the reference signal is 16, Q is 12.

In practical applications, the first memory and the second memory may be volatile memories (volatile memory), such as a random-access memory (RAM for short); or a non-volatile memory, such as read-only memory (ROM for short), a flash memory, a hard disk drive (HDD for short) or a solid-state drive (SSD for short); or a combination of the above types of memory, and provide instructions and data to processors.

The first processor and the second processor may be at least one of an application specific integrated circuit (ASIC for short), a digital signal processing device (DSPD for short), and a programmable logic device (PLD for short), a field-programmable gate array (FPGA for short), a central processing unit (CPU for short), a microprocessor unit (MPU for short), a digital signal processor (DSP for short), a controller, or a microcontroller. It may be understood that for different devices, there may be other electronic devices configured to implement the above processor functions, and the embodiments of the present disclosure are not specifically limited.

Embodiment Eleven

Based on the same inventive concept as the method for receiving of the embodiments of the present disclosure, an embodiment of the present disclosure further provides a computer-readable storage medium, such as a memory including a computer program which may be executed by the processor of the first communication node to complete steps of the methods in the above-mentioned one or more method embodiments for receiving.

Embodiment Twelve

Based on the same inventive concept as the method for sending of the embodiments of the present disclosure, an embodiment of the present disclosure further provides another computer-readable storage medium, such as a memory including a computer program which may be executed by the processor of the second communication node to complete steps of methods in the above-mentioned one or more method embodiments for sending.

Obviously, those skilled in the art should understand that the above-mentioned modules or steps of the present disclosure may be implemented by a general-purpose computing device, and they may be concentrated on a single computing device or distributed in a network composed of multiple computing apparatuses, alternatively, they may be implemented with program codes executable by the computing apparatuses, so that they may be stored in the storage device to be executed by the computing apparatuses, and in some cases, they may be performed in a different order other than that of the steps shown or described in the present disclosure, or they are made into individual integrated circuit modules respectively, or multiple modules or steps among them are implemented by making them into a single integrated circuit module. In this way, the present disclosure is not limited to any specific combination of hardware and software.

The above are only alternative embodiments of the present disclosure, which are not intended to limit the present disclosure. For those skilled in the art, the present disclosure may have various modifications and changes. Any modification, equivalent replacement, improvement, etc. within principles of this disclosure shall be included in the protection scope of this disclosure.

What is claimed is:

1. A method for receiving a reference signal, comprising:
   determining a reference signal resource used for sending the reference signal; and
   receiving the reference signal sent by using the reference signal resource;
   wherein the reference signal resource comprises a frequency domain resource, and the frequency domain resource used for sending the reference signal is determined according to a transmission comb index of the reference signal;
   wherein the method further comprises:
   determining transmission comb indexes used by reference signals of a plurality of ports; wherein determining the transmission comb indexes used by the reference signals of the plurality of ports comprises:
   in a case where a transmission comb index configured by the reference signal resource is k, determining that a transmission comb index used by a reference signal of at least one predefined port in the plurality of ports is k and transmission comb indexes used by reference signals of remaining ports are one of k or mod(k+$K_{TC}$/2, $K_{TC}$); wherein mod is a modulus function, and $K_{TC}$ is a number of transmission combs of the reference signal;
   wherein the method further comprises configuring the reference signal resource by signaling; wherein configuring the reference signal resource by the signaling comprises:
   configuring a plurality of reference signal resources by the signaling; wherein a time domain guard interval among the plurality of reference signal resources is Y time domain symbols, and a manner for determining a value of Y comprises: configuring different values of Y for different subcarrier spacings; wherein configuring the different values of Y for the different subcarrier spacings comprises at least one of:
   in a case where a subcarrier spacing is configured to be 0 or the subcarrier spacing is 15 KHz, configuring the value of Y as 1;
   in a case where a subcarrier spacing is configured to be 1 or the subcarrier spacing is 30 KHz, configuring the value of Y as 1;
   in a case where a subcarrier spacing is configured to be 2 or the subcarrier spacing is 60 KHz, configuring the value of Y as 1;
   in a case where a subcarrier spacing is configured to be 3 or the subcarrier spacing is 120 KHz, configuring the value of Y as 2; or
   in a case where a subcarrier spacing is configured to be 4 or the subcarrier spacing is 240 KHz, configuring the value of Y as 4;
   wherein the reference signal resource comprises a code domain resource, the code domain resource used for sending the reference signal is determined according to a sequence group number of the reference signal and a sequence number of the reference signal, and in a case where the sequence number of the reference signal is configured to be hopping-enabled, a sequence identity (ID) of the reference signal is used to initialize a pseudo-random sequence.

2. The method of claim 1, wherein a manner for determining the transmission comb index of the reference signal comprises one of:
   determining the transmission comb index of the reference signal according to an index offset and a transmission comb index configured by higher layer radio resource control (RRC) signaling; or
   determining a transmission comb index configured by the reference signal resource and used on a first time domain symbol within the reference signal resource, and using a predefined transmission comb index of the reference signal on remaining time domain symbols.

3. The method of claim 2, further comprising:
   determining the index offset of the reference signal according to at least one of following parameters: an index of a time slot where the reference signal is located, an index of a symbol where the reference signal is located, a number of symbols occupied by the reference signal or by the reference signal resource, a sequence ID of the reference signal, a radio network temporary identity (RNTI), a number of transmission combs of the reference signal, or a cell ID.

4. The method of claim 2, wherein the index offset of the reference signal or the predefined transmission comb index of the reference signal is determined according to following formulas:

$$(\Sigma_{m=0}^{K-1} c(K \cdot n_{s,f}^{\mu} + m) \cdot 2^m) \bmod K_{TC}$$

$$(\Sigma_{m=0}^{K-1} c(K \cdot (n_{s,f}^{\mu} M + l') + m) \cdot 2^m) \bmod K_{TC};$$

wherein, $K_{TC}$ is a number of transmission combs of the reference signal, $l' \in \{0, 1, \ldots, M-1\}$ is a predefined serial number or a serial number of a time domain symbol within the reference signal resource, K is an integer, M is a predefined integer or a configured number of symbols of the reference signal, $c(K \cdot n_{s,f}^{\mu} + m)$ is a value corresponding to a sequence number $K \cdot n_{s,f}^{\mu} + m$ in the pseudo-random sequence, $c(K \cdot (n_{s,f}^{\mu} M + l') + m)$ is a value corresponding to a sequence number $K \cdot (n_{s,f}^{\mu} M + l') + m$ in the pseudo-random sequence, and $n_{s,f}^{\mu}$ is a slot number in a radio frame; and an initial value of the pseudo-random sequence comprises one of:

$c_{init}=\lfloor N_{ID}^{cell}/K_{TC}\rfloor, c_{init}=N_{ID}^{cell} \mod K_{TC},$
$c_{init}=\lfloor n_{ID}^{SRS}/K_{TC}\rfloor, c_{init}=n_{ID}^{SRS}, c_{init}=N_{ID}^{cell},$
$c_{init}=\lfloor n_{ID}^{SRS}/K_{TC}\rfloor \cdot 2^5+(n_{ID}^{SRS}+\Delta_{ss})\mod K_{TC},$ or
$c_{init}=n_{ID}^{SRS} \mod K_{TC};$ wherein, $N_{ID}^{cell}$ is a cell identity (ID), $n_{ID}^{SRS}$ is a virtual cell ID or a sequence ID of the reference signal, $\lfloor \ \rfloor$ is a floor function, and $\Delta_{ss} \in \{0, 1, \ldots, K_{TC}-1\}$.

5. The method of claim 1, wherein determining the transmission comb indexes used by the reference signals of the plurality of ports comprises:
in the case where the transmission comb index configured by the reference signal resource is k, determining that the transmission comb index used by the reference signal of at least one predefined port in the plurality of ports is k and transmission comb indexes used by reference signals of remaining ports are $\mod(p_i+k+K_{TC}/2, K_{TC})$ or $\mod(p_i+k, K_{TC})$; wherein $p_i$ is a port index of a reference signal.

6. The method of claim 1, further comprising:
obtaining, according to a cyclic shift parameter corresponding to the reference signal, the transmission comb index of the reference signal, wherein obtaining, according to the cyclic shift parameter corresponding to the reference signal, the transmission comb index of the reference signal comprises at least one of:

$$k_{TC}^{(p_i)} = \begin{cases} \left(\bar{k}_{TC}+\dfrac{K_{TC}}{2}\right)\mod K_{TC}; n_{SRS}^{cs} \in \left\{\dfrac{n_{SRS}^{cs,max}}{2}, \dfrac{n_{SRS}^{cs,max}}{2}+1, \ldots, n_{SRS}^{cs,max}-1\right\}, \\ \quad p_i \in \{1,3\}, N_{ap}=4, K_{TC}=2 \\ \left(\bar{k}_{TC}+\dfrac{K_{TC}}{2}\right)\mod K_{TC}; n_{SRS}^{cs} \in \left\{\dfrac{n_{SRS}^{cs,max}}{3}, \dfrac{n_{SRS}^{cs,max}}{3}+1, \ldots, \dfrac{2n_{SRS}^{cs,max}}{3}-1\right\}, \\ \quad p_i \in \{1,3\}, N_{ap}=4, K_{TC}=4 \\ (\bar{k}_{TC}+p_i)\mod K_{TC}; n_{SRS}^{cs} \in \left\{\dfrac{2n_{SRS}^{cs,max}}{3}, \dfrac{2n_{SRS}^{cs,max}}{3}+1, \ldots, n_{SRS}^{cs,max}-1\right\}, \\ \quad N_{ap}=4, K_{TC}=4 \\ \bar{k}_{TC}; \text{others} \end{cases}$$

wherein, $k_{TC}^{(p_i)}$ is a transmission comb index used by a port, $K_{TC}$ is a number of transmission combs of the reference signal, $p_i$ is a port index of the reference signal, $N_{ap}$ is a number of transmission ports of the reference signal, $\bar{k}_{TC}$ is a transmission comb index configured by signaling, $n_{SRS}^{cs}$ is a cyclic shift of the reference signal, and $n_{SRS}^{cs,max}$ is a maximum serial number of cyclic shifts of the reference signal or a number of available cyclic shifts of the reference signal; or
obtaining, according to a segment position where a cyclic shift of the reference signal is located, the transmission comb index of the reference signal.

7. The method of claim 1, wherein configuring the reference signal resource by the signaling comprises:
in a case where the reference signal is an aperiodic reference signal or a type 1 of reference signal, configuring a parameter of a time slot offset of the reference signal resource by the signaling.

8. The method of claim 1, wherein
the manner for determining the value of Y further comprises at least one of:

determining the value of Y according to a capability of a device for sending; or
configuring the value of Y by the signaling.

9. A method for sending a reference signal, comprising:
determining a reference signal resource used for sending the reference signal;
and
sending the reference signal by using the determined reference signal resource;
wherein the reference signal resource comprises a frequency domain resource, and the frequency domain resource used for sending the reference signal is determined according to a transmission comb index of the reference signal;
wherein the method further comprises:
determining transmission comb indexes used by reference signals of a plurality of ports;
wherein determining the transmission comb indexes used by the reference signals of the plurality of ports comprises:
in a case where a transmission comb index configured by the reference signal resource is k, determining that a transmission comb index used by a reference signal of at least one predefined port in the plurality of ports is k and transmission comb indexes used by reference signals of remaining ports are one of k or $\mod(k+K_{TC}/2, K_{TC})$; wherein mod is a modulus function, and $K_{TC}$ is a number of transmission combs of the reference signal;
wherein the method further comprises: receiving the reference signal resource configured by signaling; wherein receiving the reference signal resource configured by the signaling comprises:
receiving a plurality of reference signal resources by the signaling; wherein a time domain guard interval among the plurality of reference signal resources is Y time domain symbols, and a manner for determining a value of Y comprises: configuring different values of Y for different subcarrier spacings; wherein configuring the different values of Y for the different subcarrier spacings comprises at least one of:
in a case where a subcarrier spacing is configured to be 0 or the subcarrier spacing is 15 KHz, configuring the value of Y as 1;
in a case where a subcarrier spacing is configured to be 1 or the subcarrier spacing is 30 KHz, configuring the value of Y as 1;
in a case where a subcarrier spacing is configured to be 2 or the subcarrier spacing is 60 KHz, configuring the value of Y as 1;
in a case where a subcarrier spacing is configured to be 3 or the subcarrier spacing is 120 KHz, configuring the value of Y as 2; or
in a case where a subcarrier spacing is configured to be 4 or the subcarrier spacing is 240 KHz, configuring the value of Y as 4;
wherein the reference signal resource comprises a code domain resource, the code domain resource used for sending the reference signal is determined according to a sequence group number of the reference signal and a sequence number of the reference signal, and in a case where the sequence number of the reference signal is configured to be hopping-enabled, a sequence identity (ID) of the reference signal is used to initialize a pseudo-random sequence.

10. The method of claim 9, wherein a manner for determining the transmission comb index of the reference signal comprises one of:
- determining the transmission comb index of the reference signal according to an index offset and a transmission comb index configured by higher layer radio resource control (RRC) signaling; or
- determining a transmission comb index configured by the reference signal resource and used on a first time domain symbol within the reference signal resource, and using a predefined comb index of the reference signal on remaining time domain symbols.

11. The method of claim 10, further comprising:
determining the index offset of the reference signal according to at least one of following parameters: an index of a time slot where the reference signal is located, an index of a symbol where the reference signal is located, a number of symbols occupied by the reference signal or by the reference signal resource, and a sequence ID of the reference signal, a radio network temporary identity (RNTI), a number of transmission combs of the reference signal or a cell ID.

12. The method of claim 10, wherein the index offset of the reference signal or the predefined transmission comb index of the reference signal is determined according to following formulas:

$$(\Sigma_{m=0}^{K-1} c(K \cdot n_{s,f}^\mu + m) \cdot 2^m) \bmod K_{TC}$$

$$(\Sigma_{m=0}^{K-1} c(K \cdot (n_{s,f}^\mu M + l') + m) \cdot 2^m) \bmod K_{TC};$$

wherein, $K_{TC}$ is a number of transmission combs of the reference signal, $l' \in \{0, 1, \ldots, M-1\}$ is a predefined serial number or a serial number of a time domain symbol within the reference signal resource, K is an integer, M is a predefined integer or a configured number of symbols of the reference signal, $c(K \cdot n_{s,f}^\mu + m)$ is a value corresponding to a sequence number $K \cdot n_{s,f}^\mu + m$ in the pseudo-random sequence, $c(K \cdot (n_{s,f}^\mu M + l') + m)$ is a value corresponding to a sequence number $K \cdot (n_{s,f}^\mu M + l') + m$ in the pseudo-random sequence, and $n_{s,f}^\mu$ is a slot number in a radio frame; and
an initial value of the pseudo-random sequence comprises one of:

$$c_{init} = \lfloor N_{ID}^{cell}/K_{TC} \rfloor, c_{init} = N_{ID}^{cell} \bmod K_{TC},$$
$$c_{init} = \lfloor n_{ID}^{SRS}/K_{TC} \rfloor, c_{init} = n_{ID}^{SRS}, c_{init} = N_{ID}^{cell},$$
$$c_{init} = \lfloor n_{ID}^{SRS}/K_{TC} \rfloor \cdot 2^5 + (n_{ID}^{SRS} + \Delta_{ss}) \bmod K_{TC}, \text{ or}$$
$$c_{init} = n_{ID}^{SRS} \bmod K_{TC};$$

wherein, $N_{ID}^{cell}$ is a cell identity (ID), $n_{ID}^{SRS}$ is a virtual cell ID or a sequence ID of the reference signal, $\lfloor \; \rfloor$ is a floor function, and $\Delta_{ss} \in \{0, 1, \ldots, K_{TC}-1\}$.

13. The method of claim 9, wherein determining the transmission comb indexes used by the reference signals of the plurality of ports comprises:
in the case where the transmission comb index configured by the reference signal resource is k, determining that the transmission comb index used by the reference signal of at least one predefined port in the plurality of ports is k and transmission comb indexes used by reference signals of remaining ports are one of mod $(p_i + k + K_{TC}/2, K_{TC})$ or mod$(p_i + k, K_{TC})$; wherein $p_i$ is a port index of a reference signal.

14. The method of claim 9, further comprising:
obtaining, according to a cyclic shift parameter corresponding to the reference signal, the transmission comb index of the reference signal wherein obtaining, according to the cyclic shift parameter corresponding to the reference signal, the transmission comb index of the reference signal comprises at least one of:

$$k_{TC}^{(p_i)} = \begin{cases} \left(\bar{k}_{TC} + \dfrac{K_{TC}}{2}\right) \bmod K_{TC}; n_{SRS}^{cs} \in \left\{\dfrac{n_{SRS}^{cs,max}}{2}, \dfrac{n_{SRS}^{cs,max}}{2}+1, \ldots, n_{SRS}^{cs,max}-1\right\}, \\ \qquad p_i \in \{1,3\}, N_{ap} = 4, K_{TC} = 2 \\ \left(\bar{k}_{TC} + \dfrac{K_{TC}}{2}\right) \bmod K_{TC}; n_{SRS}^{cs} \in \left\{\dfrac{n_{SRS}^{cs,max}}{3}, \dfrac{n_{SRS}^{cs,max}}{3}+1, \ldots, \dfrac{2n_{SRS}^{cs,max}}{3}-1\right\}, \\ \qquad p_i \in \{1,3\}, N_{ap} = 4, K_{TC} = 4 \\ (\bar{k}_{TC} + p_i) \bmod K_{TC}; n_{SRS}^{cs} \in \left\{\dfrac{2n_{SRS}^{cs,max}}{3}, \dfrac{2n_{SRS}^{cs,max}}{3}+1, \ldots, n_{SRS}^{cs,max}-1\right\}, \\ \qquad N_{ap} = 4, K_{TC} = 4 \\ \bar{k}_{TC}; \text{others} \end{cases}$$

wherein, $k_{TC}^{(p_i)}$ is a transmission comb index used by a port, $K_{TC}$ is a number of transmission combs of the reference signal, $p_i$ is a port index of the reference signal, $N_{ap}$ is a number of transmission ports of the reference signal, $\bar{k}_{TC}$ is a transmission comb index configured by signaling, $n_{SRS}^{cs}$ is a cyclic shift of the reference signal, and $n_{SRS}^{cs,max}$ is a maximum serial number of cyclic shifts of the reference signal or a number of available cyclic shifts of the reference signal; or
obtaining, according to a segment position where a cyclic shift of the reference signal is located, the transmission comb index of the reference signal.

15. The method of claim 9, wherein configuring the reference signal resource by the signaling comprises:
in a case where the reference signal is an aperiodic reference signal or a type 1 of reference signal, configuring a parameter of a time slot offset of the reference signal resource by the signaling.

16. The method of claim 9, wherein
the manner for determining the value of Y further comprises at least one of:
- determining the value of Y according to a sending capability; or
- configuring the value of Y by the signaling.

17. A device for receiving a reference signal, comprising: a first processor and a first storage; wherein the first processor is configured to execute a program stored in the first storage to implement the method of claim 1.

18. A device for sending a reference signal, comprising: a second processor and a second memory; wherein the second processor is configured to execute a program stored in the second memory to implement the method of claim 9.

19. The method of claim 1, wherein in the case where the sequence number of the reference signal is configured to be hopping-enabled, $c_{init} = \lfloor n_{ID}^{SRS}/30 \rfloor \cdot 2^5 + n_{ID}^{SRS} \bmod 30$ is used as an initial value of the pseudo-random sequence; wherein $n_{ID}^{SRS}$ is the sequence ID of the reference signal or a virtual cell ID, and mod is a modulus function.

20. The method of claim 9, wherein in the case where the sequence number of the reference signal is configured to be hopping-enabled, $c_{init} = \lfloor n_{ID}^{SRS}/30 \rfloor \cdot 2^5 + n_{ID}^{SRS} \bmod 30$ is used as an initial value of the pseudo-random sequence; wherein $n_{ID}^{SRS}$ is the sequence ID of the reference signal or a virtual cell ID, and mod is a modulus function.

* * * * *